United States Patent [19]

Swerling

[11] 4,164,738
[45] Aug. 14, 1979

[54] FOCUSED SYNTHETIC ARRAY

[75] Inventor: Peter Swerling, Pacific Palisades, Calif.

[73] Assignee: McDonnell Douglas Corporation, Long Beach, Calif.

[21] Appl. No.: 560,386

[22] Filed: Jun. 23, 1966

[51] Int. Cl.² .............................................. G01S 9/42
[52] U.S. Cl. .................................. 343/5 CM; 343/7.7
[58] Field of Search ................ 343/7.7, 16 SD, 5 CM

[56] References Cited

U.S. PATENT DOCUMENTS

| | | | |
|---|---|---|---|
| 2,705,758 | 4/1955 | Kaprelian | 250/330 |
| 3,044,057 | 7/1962 | Thourel et al. | 343/7.7 |
| 3,271,769 | 9/1969 | Trafford et al. | 248/206 R |

Primary Examiner—Maynard R. Wilbur
Assistant Examiner—Richard E. Berger
Attorney, Agent, or Firm—Walter J. Jason; Donald L. Royer; John P. Scholl

[57] ABSTRACT

This invention relates to a focused synthetic array wherein a different signal from a crossed beam antenna is converted to a bipolar video signal and applied as the input to a synthetic array processor. In another embodiment of the invention there is a separate reduction of each beam output from a crossed beam antenna to bipolar video signals with a separate application of asymmetrical amplitude weights to the two bipolar video records and a subsequent subtraction in the course of synthetic array processing.

12 Claims, 6 Drawing Figures

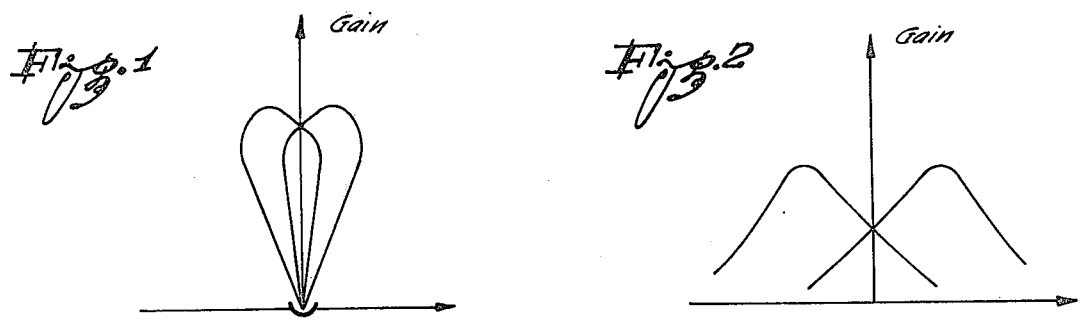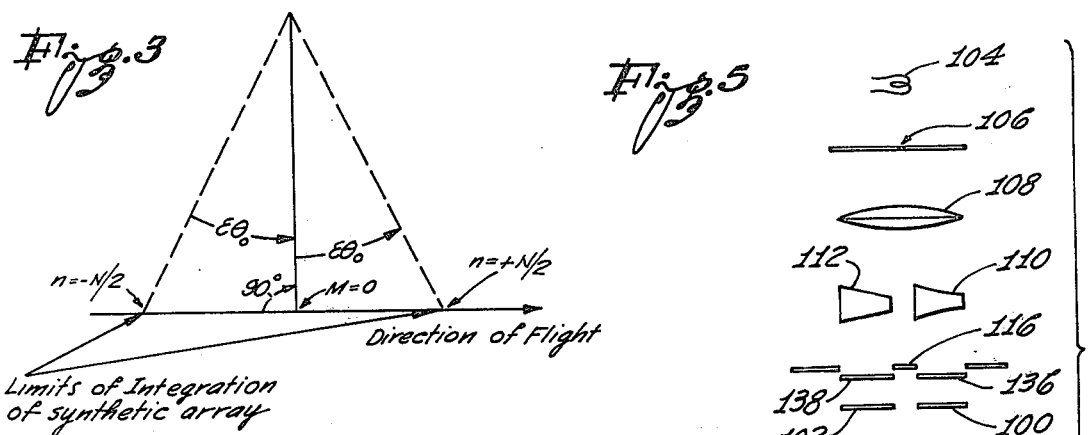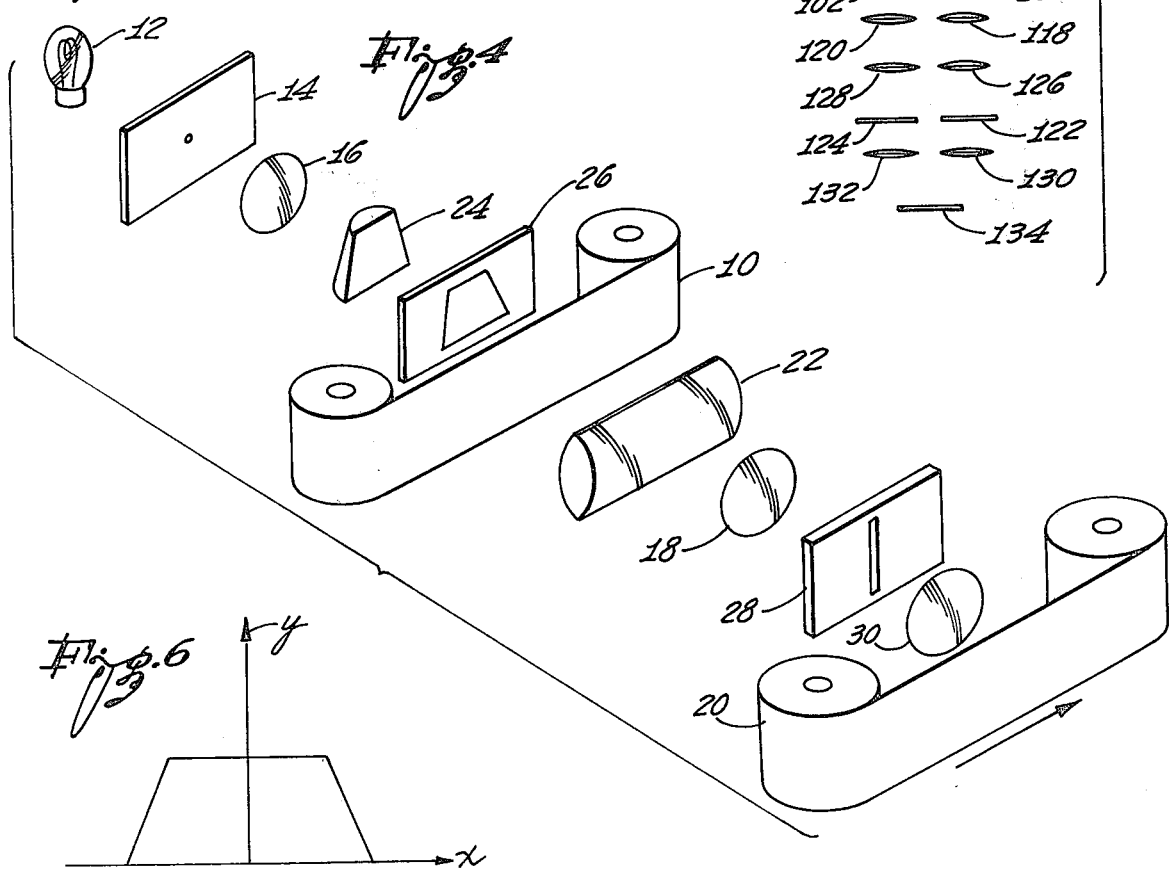

FOCUSED SYNTHETIC ARRAY

This application relates to a focused synthetic array radar system. A description of synthetic array radars will be found in the following articles:

"A high-resolution radar combat-surveillance system," IRE Trans. on Military Electronics, vol. MIL-5, pp. 127-131, April 1961

"A Comparison of Techniques for Achieving Fine Azimuth Resolution," by L. J. Cutrona and G. O. Hall, IRE Trans. of Military Electronics, vol. MIL-6, pp. 119-121, April, 1962, and "Theory and Evaluation of Gain Patterns of Synthetic Arrays," by R. C. Heimiller, IRE Trans. on Military Electronics, vol. MIL-6, pp. 122-129, April, 1962.

More particularly, the application relates to a coherent, focused, side-looking, synthetic array reconnaissance radar having a Moving Target Indication (MTI) which is capable of greater sensitivity than previous radar systems. In the radar system of the present invention, signals produced by targets having zero radial velocity are suppressed and signals produced by targets having non-zero radial velocity are not suppressed.

The invention employs an antenna having two crossed beams, as in a monopulse antenna.

In a first embodiment of the invention a difference signal from the crossed beam antenna is converted to a bipolar video signal and applied as the input to a synthetic array processor. In a second embodiment of the invention, there is a separate reduction of each beam output from a crossed beam antenna to bipolar video signals. Then there is a separate application of asymmetrical amplitude weights to the two bipolar video records, and a subsequent subtraction in the course of synthetic array processing. The second embodiment produces a better suppression of stationary targets than that obtained in the first embodiment.

The physical antenna used in the radar system of the invention forms two separate beams. Each beam axis is displaced from broadside by some fraction of a beamwidth. The two beam axes are displaced from broadside in opposite directions but by equal amounts, so that the crossover point of their gain patterns is at broadside. This can be accomplished by a standard monopulse feed, for example, as shown in the Antenna Engineering Handbook by Henry Jasik, McGraw Hill 1961, chapter 25, pp. 25-30.

A clearer understanding of the invention will be had upon an examination of the following description and drawings wherein:

FIG. 1 illustrates the gain pattern of an antenna having two crossed beams;

FIG. 2 is a graph showing the gain versus angle off broadside of an antenna having a gain pattern illustrated in FIG. 1;

FIG. 3 illustrates a geometric figure used in explaining the invention;

FIG. 4 is a diagram of a synthetic array-forming optical processor used with the first embodiment of the invention;

FIG. 5 is a diagram of a synthetic array-forming optical processor used with the second embodiment of the invention, and FIG. 6 is a curve of the transmissivity of the mask shown in FIG. 5.

FIG. 1 shows the gain pattern of the type of antenna used in the invention. Assuming the radar is mounted on an aircraft, the direction of flight and the broadside position are as shown in FIG. 1. Also, as can be seen in FIG. 1, the antenna has a crossed beam pattern having first and second beams oriented equally oppositely away from the broadside position.

FIG. 2 illustrates the gain of the two antenna beams of FIG. 1. As can be seen in FIG. 2, each beam has a maximum gain at an equal but opposite angle off of broadside.

In the first embodiment of the invention, the outputs of the two beams are subtracted at the antenna or at any stage of the receiver up to and including the video stage. The difference signal is reduced to a bipolar video signal by maintaining the distinction between positive and negative phase. The bipolar video signal is then subjected to any of the signal processing methods by which a synthetic array is formed. In particular, the bipolar video difference signal can be recorded on film and subjected to standard optical processing techniques to form a synthetic array. The synthetic array is focused at broadside.

In the second embodiment of the invention, the two beam outputs of the antenna are separately reduced to bipolar video signals. The two bipolar video records are then amplitude weighted across the synthetic array length by two separate sets of amplitude weights. The weighted bipolar video signals are then coherently subtracted and a synthetic array, focused at broadside, is formed. Alternatively, the two weighted bipolar videos are separately processed to form separate synthetic arrays, each focused at broadside, and the outputs of the two arrays subtracted incoherently.

The amplitude weights are determined as follows. The two-way amplitude gain of the first beam near broadside is proportional to $1 - \alpha\ \theta$, and that of the second beam is equal to $1 + \alpha\ \theta$ where $\theta$ is the angle from broadside and $\alpha$ is a constant. The synthetic array integrates from $-\epsilon\ \theta_o$ to $+\epsilon\ \theta_o$, where $\epsilon\ \theta_o$ is some fraction of the physical beamwidth $\theta_o$. The amplitude weights applied across the synthetic array length to the bipolar video output of the first beam are chosen to be $H(\theta)\ (1 - \alpha\ \theta)^{-1}$ for $-\epsilon\ \theta_o \leq \theta \leq \epsilon\ \theta_o$, where $H(\theta)$ is an arbitrary function of $\theta$. The weights applied across the synthetic array length to the bipolar video output of the second beam are $H(\theta)\ (1 + \alpha\ \theta)^{-1}$ for $-\epsilon\ \theta_o \leq \theta \leq \epsilon\ \theta_o$. For purposes of illustration, we assumed approximately linear beam gain the neighborhood of the crossover points. However, strict linearity is not necessary and the invention would work well even if the beams were not perfectly linear near the crossover point. In this case the amplitude weights chosen would be the reciprocals of the beam gains across the synthetic array length, multiplied by an arbitrary function of $\theta$.

The voltage output of a synthetic array due to a stationary point target located at angle $\theta$ from broadside is proportional to $$\sum_{-N/2}^{N/2} w_n e^{j\,a\,n\,\theta} \quad (1)$$

where the synthetic array integrates N+1 pulses, and
$a = (4\ \pi\ V\ \Delta\ t)/\lambda$
$\lambda$ = wavelength
$V$ = aircraft speed
$\Delta\ t$ = interpulse period
$w_n$ = amplitude weight for $n^{th}$ pulse FIG. 3 illustrates a figure showing the geometry of expression (1).

A target having radial velocity dv has the same doppler history as a stationary target displaced by an angle dv/V. If a synthetic array is focused at broadside, a target having radial velocity dv produces an output in the array when the target is at angle dv/V. A stationary target located at broadside produces an output:

$$\sum_{-N/2}^{N/2} w_n \tag{2}$$

and a target having radial velocity dv produces an output given by the expression (2) when it is located at angle dv/V. However, this does not mean that the outputs for the stationary and moving targets are the same, since the applicable weights $w_n$ are not the same.

Let $w_n^{(1)}$ and $w_n^{(2)}$ be the amplitude weights for the $n^{th}$ pulse from the first and second beams, respectively. These weights $n_n^{(i)}$, $i=1, 2$ are the products of several factors.

First, the beam gains $1-\alpha\,\theta$ and $1+\alpha\,\theta$ introduce weight factors which we denote by $\beta_n^{(i)}$, $i=1, 2$. For a target moving with radial velocity dv, the weights $\beta_n^{(i)}$ are:

$$\beta_n^{(1)} = 1 - \alpha\, dv/V - 2\,\alpha\,\epsilon\,\theta_o\, n/N$$

$$\beta_n^{(2)} = 1 + \alpha\, dv/V + 2\,\alpha\,\epsilon\,\theta_o\, n/N \quad -(N/2) \leq n \leq +N/2 \tag{3}$$

Strictly speaking, the weights are proportional to $\beta_n^{(i)}$ but it is unnecessary to worry about normalization. Also, as previously noted, the linearity assumption for the beam gains is for illustrative purposes and is not really necessary.

In addition, a target may have a cross section which varies with aspect over the length of the synthetic array. This variation introduces another set of weighting factors $\gamma_n^{(i)}$, where $\gamma_n^{(1)} = \gamma_n^{(2)}$. These weighting factors are denoted by $\gamma_n$.

Also, additional weighting factors $A_n^{(i)}$ may be introduced in the data processing. Thus, the overall weights $w_n^{(i)}$, $i=1, 2$ associated with the pulses out of the two beams are, for a target having radial velocity dv, $$w_n^{(i)} = \beta_n^{(i)} \gamma_n A_n^{(i)} \tag{4}$$

In the first embodiment of the invention, the beam outputs are subtracted and subsequently processed to form a synthetic array. The voltage output of this synthetic array, formed from the difference signal, is for a stationary target at broadside or a target at angle dv/V having radial velocity dv $$\sum_{-N/2}^{N/2} (w_n^{(2)} - w_n^{(1)}) = \sum_{-N/2}^{N/2} \gamma_n [\beta_n^{(2)} - \beta_n^{(1)}] \tag{5}$$

For this version, the weights $A_n^{(i)}$ are all equal to unity.

For a target having radial velocity dv, the output is, substituting expression (3) into expression (5), $$2\alpha \sum_{-N/2}^{N/2} \gamma_n \left[ \frac{dv}{V} + \frac{2\epsilon\theta_o n}{N} \right] \tag{6}$$

On the other hand, the output of a sum signal which is fed into a synthetic array processor would be $$\sum_{-N/2}^{N/2} (w_n^{(1)} + w_n^{(2)}) = \sum_{-N/2}^{N/2} \gamma_n (\beta_n^{(1)} + \beta_n^{(2)}) = 2 \sum_{-N/2}^{N/2} \gamma_n \tag{7}$$

The ratio between the voltage output of a synthetic array formed from the difference channel and one formed from a sum channel can be defined as the voltage cancellation ratio. This would be $$\frac{\alpha \sum_{-N/2}^{N/2} \gamma_n \left[ \frac{dv}{V} + \frac{2\epsilon\theta_o n}{N} \right]}{\sum_{-N/2}^{N/2} \gamma_n} \tag{8}$$

Now, suppose $\gamma_n$ is an even function of n, i.e., $\gamma_{-n} = \gamma_n$. Then, the second term in expression (8) is zero. In particular, this holds if $\gamma_n \equiv$ const. The cancellation ratio for radial velocity dv is $$\frac{\frac{\alpha dv}{V} \Sigma \gamma_n}{\Sigma \gamma_n} = \frac{\alpha dv}{V} \tag{9}$$

Thus, if the variation of cross section with aspect is symmetrical with respect to broadside, a stationary target ($dv=0$) cancels perfectly, i.e., have zero output) while a moving target has a voltage output proportional to the product of its radial velocity and the square root of its cross section. This is true when $\Sigma \gamma_n$ is proportional to the square root of the target cross section.

However, if $\gamma_n$ is not even with respect to n, that is, if the cross section versus aspect variation is asymmetrical, the voltage cancellation ratio for a stationary target is $$\frac{2\alpha\epsilon\theta_o \sum_{-N/2}^{N/2} \frac{n \gamma_n}{N}}{\sum_{-N/2}^{N/2} \gamma_n} \tag{10}$$

It should be noted that if the crossover point of the two beams in FIG. 2 is approximately at the $\frac{1}{2}$ - voltage points, then $\alpha\,\theta_o \approx 2$.

Thus, a stationary target would not cancel identically if there is an asymmetrical variation of cross section with aspect. This statement applied only to the first embodiment of the invention in which $A_n^{(i)} = 1$.

In the second embodiment of the invention, the amplitude weights $A_n^{(i)}$ are not uniform, but are chosen as follows:

$$A_n^{(1)} = \left[ 1 - \frac{2\alpha\epsilon\theta_o n}{N} \right]^{-1} h_n \tag{11}$$

$$A_n^{(2)} = \left[ 1 + \frac{2\alpha\epsilon\theta_o n}{N} \right]^{-1} h_n$$

where $h_n$ are arbitrary and are chosen for convenience.

Then, the voltage output for a target with radial velocity dv is:

$$\Sigma (w_n^{(2)} - w_n^{(1)}) = \tag{12}$$

$$\Sigma h_n \gamma_n [A_n^{(2)} \beta_n^{(2)} - A_n^{(1)} \beta_n^{(1)}] =$$

-continued $$\Sigma\, h_n\gamma_n \frac{adv}{V}\left\{\left[1+\frac{2\alpha\epsilon\theta_o\, n}{N}\right]^{-1}+\left[1-\frac{2\alpha\epsilon\theta_o\, n}{N}\right]^{-1}\right\}=$$

$$\frac{adv}{V}\Sigma\, \gamma_n h_n\left\{\left[1+\frac{2\alpha\epsilon\theta_o\, n}{N}\right]^{-1}+\left[1-\frac{2\alpha\epsilon\theta_o\, n}{N}\right]^{-1}\right\}$$

Thus, the output is always zero, for $dv=0$ regardless of the values of $\gamma_n$. Stationary targets always cancel exactly. The voltage cancellation ratio for radial velocity dv is nearly equal to the last line of expression (12) divided by $2\,\Sigma\,\gamma_n h_n$.

As an example, $\epsilon$ may have a value of $\epsilon < 1/6$. For this range of values of $\epsilon$, and recalling that $\alpha\,\theta_o$ is of the order of 2, the expression (12) reduces to approximately $$\text{Voltage output}\approx\Sigma\,\frac{2\alpha dv}{V}\gamma_n h_n\left[1+\left(\frac{2\alpha\epsilon\theta_o n}{N}\right)^2\right] \quad (13)$$

Also for radial velocity dv, $$\frac{adv}{V}\left\{1+(2\alpha\epsilon\theta_o)^2\frac{\Sigma\,(\frac{n}{N})^2\gamma_n h_n}{\Sigma\,\gamma_n h_n}\right\}\approx \quad (14)$$

Voltage Cancellation Ratio

The first embodiment of the invention requires a split beam antenna which can be obtained by a monopulse feed or any other standard way of obtaining a split beam. A difference signal is produced from the split beam and the difference signal is reduced to a bipolar video signal. The bipolar video signal is processed by a synthetic array-forming optical processor, for example, as shown in FIG. 4, or any other type of synthetic array-forming processor such as an electronic processor.

In the optical correlator shown in FIG. 4, the azimuth direction is in the direction of motion of the film and the range direction is normal to the direction of motion of the film.

The bipolar video signal is recorded on a signal film 10. A light source 12, collimating pinhole 14 and collimating lens 16 provide a plane parallel wave front on the signal film 10. A camera lens 18 shortens the focus so that a final film 20 can be located nearer to the rest of the apparatus. A cylindrical lens 22 is required for range focusing. A conical lens 24 is required because the focal length for each range element is different, and the conical lens 24 provides the additional focusing needed for each range element to allow the final film 20 to be flat. An aperture stop 26 is used to provide the proper amount of light to expose the final film 20. A field stop 28 operates as a focal plane shutter to have small portions of the final film exposed quickly to provide a sharper image on the final film. A relay lens 30 focuses the field stop on the final film 20 to avoid physical contact between stop and film.

The second embodiment of the invention also utilizes a split beam antenna. The outputs of the two beams are separately received and separately reduced to bipolar video signals. In the second embodiment of the invention, two bipolar video film strips are prepared, one from the positive output of the second beam, the other from the negative output of the first beam. An alternative method is to record the positive video on both film strips and introduce an optical wedge to produce a 180-degree phase shift in one of the optical paths.

A side view of the modified optical processor is shown in FIG. 5. The upper signal film 100 is the output of the second beam and the lower signal film 102 is the output of the first beam.

A single light source 104, collimating pinhole 106 and collimating lens 108 provide a plane parallel wave front. Two conical lenses 110 and 112, aperture stops 114 and 116, signal film strips 110 and 102, cylindrical lenses 118 and 120, field stops 122 and 124, and camera lenses 126 and 128 are utilized, one each for the upper and lower signal film strips. An upper relay lens 130 and a lower relay lens 132, in addition to focusing the upper and lower field stops on a final film 134, are also designed to focus the upper field stop 122 and the lower field stop 124 so as to add on the same final film strip. If both signal films have recorded positive bipolar video, a 180-degree phase shift must be introduced in one of the paths, as shown in FIG. 5. This could be done by an optical wedge inserted, for example, between the upper relay lens and the final film.

Alternatively, one could have only a single field stop and relay lens by constructing the two camera lenses or the two cylindrical lenses to focus the two signals to add at the field stop.

Variable transmissivity masks 136 and 138 on the upper and lower aperture stops provide the amplitude weights $A_n^{(i)}$, $i=1, 2$. Here, the function $H(\theta)$ described previously is chosen to be $(1-(\alpha\,\theta)^2)$. That is, the numbers $h_n$ described previously are:

$$h_n = 1 - \left(\frac{2\alpha\epsilon\theta_o\, n}{N}\right)^2 \quad (15)$$

so that $$A_n^{(1)} = 1 + \frac{2\alpha\epsilon\theta_o\, n}{N} \quad (16)$$

$$A_n^{(2)} = 1 - \frac{2\alpha\epsilon\theta_o\, n}{N}$$

Described in terms of $\theta$, the weighting functions are:

$$A^{(1)}(\theta)=1+\alpha\,\theta,\ -\epsilon\,\theta_o \leq \theta \leq \epsilon\,\theta_o$$

$$A^{(2)}(\theta)=1-\alpha\,\theta,\ -\epsilon\,\theta_o \leq \theta \leq \epsilon\,\theta_o \quad (17)$$

Thus, the upper and lower variable transmissivity masks have transmissivity as a function of distance across the mask as illustrated in FIG. 6.

At any given value of y, the transmissivity for the upper mask varies linearly from $1+|\alpha\,\epsilon\,\theta_o|$ to $1-|\alpha\,\epsilon\,\theta_o|$ from the left edge to the right edge. For the lower mask, the variation is in the opposite direction but otherwise the same. Actually, the variation is proportional to the stated variation, since the amount of light transmitted cannot exceed 100%.

It is to be noted that although the invention has been described with reference to particular embodiments, adaptations and modifications may be made. For example, the processing of the signals may be done electronically. The invention, therefore, is to be limited only by the appended claims.

What is claimed is:

1. In a focused synthetic array radar, means for producing indications of moving targets and for suppressing indications of stationary targets, including:

first antenna means having a gain pattern forming two separate crossed beams, second means operatively coupled to the antenna means for producing individual output signals from each of the two crossed beams, third means operatively coupled to the second means for producing a difference signal from the individual output signals, and fourth means operatively coupled to the third means and responsive to the difference signal for processing the difference signal to produce a synthetic array.

2. In a focused synthetic array radar, means for producing indications of moving targets and for suppressing indications of stationary targets, including:

first antenna means having a gain pattern forming two separate cross beams, second means operatively coupled to the antenna means for producing individual output signals from each of the two crossed beams, third means operatively coupled to the second means for producing a difference signal from the individual output signals, fourth means operatively coupled to the third means and responsive to the difference signal for processing the difference signal to produce a synthetic array, and fifth means operatively coupled to the individual output signals for asymmetrically weighting the individual output signals to suppress indications of stationary targets in the synthetic array.

3. In a focused synthetic array radar, means for producing the indications of moving targets and for suppressing indications of stationary targets, including, first antenna means having a gain pattern forming two separate crossed beams, second means operatively coupled to the first antenna means for producing individual output signals from each of the two crossed beams, third means operatively coupled to the second means for producing a difference signal from the individual output signals, fourth means operatively coupled to the third means for converting the difference signal to a bipolar video signal, and fifth means operatively coupled to the fourth means and responsive to the bipolar video signal for processing the bipolar video signal to produce a synthetic array.

4. In a focused synthetic array radar, means for producing indications of moving targets and for suppressing indications of stationary targets, including, first antenna means having a gain pattern forming two separate crossed beams, second means operatively coupled to the antenna means for producing individual output signals from each of the two cross beams, third means operatively coupled to the second means and responsive to a first one of the individual output signals for processing the first output signal to produce a synthetic array, fourth means operatively coupled to the second means and responsive to a second one of the individual output signals for processing the first output signal to produce a synthetic array, and fifth means operatively coupled to the third and fourth means for subtracting one of the output signals from the other of the output signals to produce from the third and fourth means a single synthetic array from the difference between the first and second output signals.

5. In a focused synthetic array radar, means for producing indications of moving targets and for suppressing indications of stationary targets, including, first antenna means having a gain pattern forming two separate crossed beams, second means operatively coupled to the antenna means for producing individual output signals from each of the two crossed beams, third means operatively coupled to the second means and responsive to a first one of the individual output signals for processing the first output signal to produce a synthetic array, fourth means operatively coupled to the second means and responsive to a second one of the individual output signals for processing the first output signal to produce a synthetic array, fifth means operatively coupled to the third and fourth means for subtracting one of the output signals from the other of the output signals to produce from the third and fourth means a single synthetic array from the difference between the first and second output signals, and sixth means operatively coupled to the first and second output signals for asymmetrically weighting the amplitudes of the first and second output signals to suppress indications of stationary targets in the synthetic array.

6. In a focused synthetic array radar, means for producing indications of moving targets and for suppressing indications of stationary targets, including first antenna means having a gain pattern forming two separate crossed beams, second means operatively coupled to the antenna means for producing individual output signals from each of the two crossed beams, third means operatively coupled to the second means and responsive to a first one of the individual output signals for converting the first output signal to a first bipolar video signal, fourth means operatively coupled to the third means for processing the first bipolar video signal to produce a synthetic array, fifth means operatively coupled to the second means and responsive to a second one of the individual output signals for converting the second output signal to a second bipolar video signal, sixth means operatively coupled to the fifth means for processing the second bipolar video signal to produce a synthetic array, and seventh means operatively coupled to the fourth and sixth means for subtracting one of the bipolar video signals from the other of the bipolar video signals to produce from the fourth and sixth means a single synthetic array from the difference between the first and second bipolar video signals.

7. In a focused synthetic array radar, means for producing indications of moving targets and for suppressing indications of stationary targets, including first antenna means having a gain pattern forming two separate cross beams, second means operatively coupled to the antenna means for producing individual output signals from each of the two cross beams, third means operatively coupled to the second means and responsive to a first one of the individual output signals for converting the first output signal to a first bipolar video signal, fourth means operatively coupled to the third means for processing the first bipolar video signal to produce a synthetic array, fifth means operatively coupled to the second means and responsive to a second one of the individual output signals for converting the second output signal to a second bipolar video signal, sixth means operatively coupled to the fifth means for processing the second bipolar video signal to produce a synthetic array, seventh means operatively coupled to the fourth and sixth means for subtracting one of the bipolar video signals from the other of the bipolar video signals to produce from the fourth and sixth means a single synthetic array from the difference between the first and second bipolar video signals, and eighth means operatively coupled to the first and second bipolar video signals for asymmetrically weighting the amplitudes of the first and second bipolar video signals to suppress indications of stationary targets in the synthetic array.

8. In a focused synthetic array radar including means for processing a signal to produce a synthetic array, a moving target indicator, including an antenna having a gain pattern forming two separate beams and having each beam axis displaced from a broadside position in opposite directions but by equal amounts of a fraction of each beamwidth, means operatively coupled to the antenna for producing an output from each of the two separate beams, and means responsive to the outputs from each of the two separate beams for subtracting the output of one of the beams from the output of the other of the beams to produce an output signal equal to the difference between the outputs of each of the two separate beams.

9. In a focused synthetic array radar including means for processing a signal to produce a synthetic array, a moving target indicator, including an antenna having a gain pattern forming two separate beams and having each beam axis displaced from a broadside position in opposite directions but by equal amounts of a fraction of each beamwidth, means operatively coupled to the antenna for producing an output from each of the two separate beams, means responsive to the outputs from each of the two separate beams for subtracting the output of one of the beams from the output of the other of the beams to produce an output signal equal to the difference between the outputs of each of the two separate beams, and means operatively coupled to the last-mentioned means and responsive to the difference between the outputs of each of the two separate beams for converting the difference to a bipolar video signal.

10. In a focused synthetic array radar including means for processing an output signal to produce a synthetic array, a moving target indicator including an antenna having a gain pattern forming two separate beams and having each beam axis displaced from a broadside position in opposite directions but by equal amounts of a fraction of each beamwidth, means operatively coupled to the antenna for producing an output from each of the two separate beams, means responsive to the outputs from each of the two separate beams for subtracting the output of one of the beams from the output of the other of the beams to produce an output signal equal to the difference between the outputs of each of the two separate beams, and means operatively coupled to the outputs from each of the two separate beams for asymmetrically weighting the amplitudes of the outputs of the two separate beams to suppress indications of stationary targets in the synthetic array.

11. A method of providing a moving target indication in a synthetic array radar system including the steps of forming a gain pattern from an antenna having two separate crossed beams, receiving information from each of the two crossed beams, subtracting the information from one of the crossed beams from the information of the other of the crossed beams to produce a difference signal, converting the difference signal to a bipolar video signal, and processing the bipolar video signal to form a synthetic array.

12. A method of providing a moving target indication in a synthetic array radar system including the steps of forming a gain pattern from an antenna having two separate crossed beams, receiving information from each of the crossed beams, converting the information of one of the crossed beams to a first bipolar video signal, converting the information of the other of the crossed beams to a second bipolar video signal, processing the first bipolar video signal to form a synthetic array, processing the second bipolar video signal to form a synthetic array, subtracting the first bipolar video signal from the second bipolar video signal during the synthetic array processing to form a single synthetic array representative of the difference between the first and second bipolar video signals, and applying asymmetric amplitude weights to the first and second bipolar video signals to suppress indications of stationary targets.

* * * * *